US012799038B2

(12) United States Patent
Kudoh

(10) Patent No.: US 12,799,038 B2
(45) Date of Patent: Nov. 17, 2026

(54) CUBIC BORON NITRIDE SINTERED BODY

(71) Applicant: TUNGALOY CORPORATION, Fukushima (JP)

(72) Inventor: Takahide Kudoh, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 560 days.

(21) Appl. No.: 18/455,658

(22) Filed: Aug. 25, 2023

(65) Prior Publication Data

US 2024/0067574 A1 Feb. 29, 2024

(30) Foreign Application Priority Data

Aug. 30, 2022 (JP) ................................ 2022-137154

(51) Int. Cl.

| | |
|---|---|
| ***C04B 35/5831*** | (2006.01) |
| ***B22F 1/142*** | (2022.01) |
| ***B22F 3/14*** | (2006.01) |
| ***B22F 9/04*** | (2006.01) |
| ***C22C 1/05*** | (2023.01) |
| ***C22C 26/00*** | (2006.01) |
| ***C22C 29/00*** | (2006.01) |
| ***C22C 29/16*** | (2006.01) |
| *B22F 5/00* | (2006.01) |

(52) U.S. Cl.

CPC .......... *C04B 35/5831* (2013.01); *B22F 1/142* (2022.01); *B22F 3/14* (2013.01); *B22F 9/04* (2013.01); *C22C 1/05* (2013.01); *C22C 26/00* (2013.01); *C22C 29/005* (2013.01); *C22C 29/16* (2013.01); *B22F 2005/001* (2013.01); *B22F 2009/043* (2013.01); *B22F 2201/20* (2013.01); *B22F 2301/052* (2013.01); *B22F 2301/15* (2013.01); *B22F 2301/20* (2013.01); *B22F 2302/10* (2013.01); *B22F 2302/205* (2013.01); *B22F 2304/10* (2013.01); *B22F 2998/10* (2013.01); *B22F 2999/00* (2013.01); *C04B 2235/3847* (2013.01); *C04B 2235/386* (2013.01); *C04B 2235/402* (2013.01); *C04B 2235/404* (2013.01); *C04B 2235/405* (2013.01); *C04B 2235/5436* (2013.01); *C04B 2235/5445* (2013.01); *C22C 2026/005* (2013.01); *C22C 2026/006* (2013.01)

(58) Field of Classification Search

CPC .............. C04B 35/5831; C04B 35/645; C04B 2235/3847; C04B 2235/386; C04B 2235/3804; C04B 2235/3817; C22C 26/00; C22C 2026/005; C22C 2026/006

See application file for complete search history.

(56) References Cited

U.S. PATENT DOCUMENTS

| | | | | |
|---|---|---|---|---|
| 11,208,358 | B2 * | 12/2021 | Okamura | ............ C04B 35/5831 |
| 2013/0291446 | A1 | 11/2013 | Kukino et al. | |
| 2021/0094882 | A1 * | 4/2021 | Okamura | ............ C04B 35/5831 |

FOREIGN PATENT DOCUMENTS

| | | | |
|---|---|---|---|
| EP | 3854899 | A1 | 7/2021 |
| JP | 2008-222485 | A | 9/2008 |
| WO | 2020/059756 | A1 | 3/2020 |

OTHER PUBLICATIONS

Andreev et al. X-ray powder diffraction analysis of a tungsten carbide-based ceramic. 2019. IOP Conf. Ser.: Mater. Sci. Eng. 558. DOI 10.1088/1757-899X/558/1/012003 (Year: 2019).*

Andreev P. V. et al., "X-ray powder diffraction analysis of a tungsten carbide-based ceramic", IOP Conference Series: Materials Science and Engineering, vol. 558, No. 1, Jun. 1, 2019, p. 012003, doi: 10.1088/1757-899X/558/1/012003.

* cited by examiner

*Primary Examiner* — Noah S Wiese

(74) *Attorney, Agent, or Firm* — Studebaker Brackett PLLC

(57) ABSTRACT

A cubic boron nitride sintered body including cubic boron nitride and a binder phase, wherein: a content ratio of the cubic boron nitride is 85 volume % or more and 95 volume % or less, a content ratio of the binder phase is 5 volume % or more and 15 volume % or less, the binder phase contains $Co_3W_3C$, $W_2Co_{21}B_6$, and an Al compound, and $I_B/I_A$ is 0.02 or more and 0.15 or less, $I_C/I_A$ is 0.02 or more and 1.00 or less, and $I_C \geq I_D$, where $I_A$ denotes an X-ray diffraction peak intensity of a (111) plane of the cubic boron nitride, $I_B$ denotes an X-ray diffraction peak intensity of a (400) plane of the $Co_3W_3C$, $I_C$ denotes an X-ray diffraction peak intensity of a (420) plane of the $W_2Co_{21}B_6$, and $I_D$ denotes an X-ray diffraction peak intensity of a (001) plane of WC.

16 Claims, No Drawings

CUBIC BORON NITRIDE SINTERED BODY

BACKGROUND OF THE INVENTION

Field of the Invention

The present invention relates to a cubic boron nitride sintered body.

Description of Related Art

Cubic boron nitride (hereinafter also referred to as "cBN") has hardness second only to diamond, and excellent thermal conductivity. Cubic boron nitride also has a characteristic of low affinity with iron as compared with diamond. Therefore, a cubic boron nitride sintered body containing cubic boron nitride and a binder phase of a metal or ceramic is used in a cutting tool or a wear resistant tool.

Since sintered metals have high moldability, and have a complicated shape in many cases, when they are processed with a tool, the tool is easily fractured by thermal shock. Besides, since sintered metals may contain hard particles in some cases, the tool is easily worn away. Therefore, cubic boron nitride is used in many cases of processing sintered metals, and in particular, many studies have been made on cubic boron nitride sintered bodies having a high cubic boron nitride content.

For example, International Publication No. WO2020/059756 discloses a cubic boron nitride sintered body containing 85 volume % or more and less than 100 volume % of cubic boron nitride particles and the balance of a binder, wherein the binder contains WC, Co, and an Al compound, the binder contains $W_2Co_{21}B_6$, and, a ratio of $I_C$ to $I_A$, $I_C/I_A$, is more than 0 and less than 0.10, and a ratio of $I_C$ to $I_B$, $I_C/I_B$, is more than 0 and less than 0.40, where $I_A$ denotes an X-ray diffraction intensity of a (111) plane of the cubic boron nitride particles, $I_B$ denotes an X-ray diffraction intensity of a (100) plane of the WC, and $I_C$ denotes an X-ray diffraction intensity of a (420) plane of the $W_2Co_{21}B_6$.

SUMMARY

Technical Problem

In recent years, higher efficiency is required in cutting processing, and hence high speed, high feeding speed, and deeper cutting depth are more remarkably required. In accordance with such a trend, a cubic boron nitride sintered body excellent in wear resistance and fracture resistance, and capable of providing long tool life is required also in high-speed processing of a sintered metal.

Under such circumstances, the cubic boron nitride sintered body disclosed in International Publication No. WO2020/059756 does not sufficiently contain $Co_3W_3C$, and, moreover, the X-ray diffraction intensity of the (420) plane of $W_2Co_{21}B_6$ is far smaller than the X-ray diffraction intensity of the (100) plane of WC, thus the content ratio of WC being high, which tends to weaken the binding strength of the cubic boron nitride sintered body, and hence the fracture resistance is easily deteriorated.

The present invention has an object to provide a cubic boron nitride sintered body capable of extending the tool life by having excellent wear resistance and fracture resistance.

Solution to Problem

The present inventor has conducted studies about the extension of tool life and has accordingly found that the wear resistance and the fracture resistance thereof can be improved if a cubic boron nitride sintered body has a specific constitution, and as a result, the tool life can be extended. Finally, the present inventor has completed the present invention based on such findings.

The gist of the present invention is as set forth below.

[1]

A cubic boron nitride sintered body comprising cubic boron nitride and a binder phase, wherein a content ratio of the cubic boron nitride is 85 volume % or more and 95 volume % or less based on a total amount of the sintered body, a content ratio of the binder phase is 5 volume % or more and 15 volume % or less based on the total amount of the sintered body, the binder phase comprises $Co_3W_3C$, $W_2Co_{21}B_6$, and an Al compound, and $I_B/I_A$ is 0.02 or more and 0.15 or less, $I_C/I_A$ is 0.02 or more and 1.00 or less, and $I_C \geq I_D$, where $I_A$ denotes an X-ray diffraction peak intensity of a (111) plane of the cubic boron nitride, $I_B$ denotes an X-ray diffraction peak intensity of a (400) plane of the $Co_3W_3C$, $I_C$ denotes an X-ray diffraction peak intensity of a (420) plane of the $W_2Co_{21}B_6$, and $I_D$ denotes an X-ray diffraction peak intensity of a (001) plane of WC.

[2]

The cubic boron nitride sintered body according to [1], wherein $I_C/I_A$ is 0.00 or more and 0.20 or less.

[3]

The cubic boron nitride sintered body according to [1] or [2], wherein $I_C/I_B$ is 0.2 or more and 15.0 or less.

[4]

The cubic boron nitride sintered body according to any one of [1] to [3], wherein a full width at half maximum of $I_C$ is 0.25 or more and 0.60 or less.

[5]

The cubic boron nitride sintered body according to any one of [1] to [4], wherein an average particle size of the cubic boron nitride is 0.5 μm or more and 4.0 μm or less.

Advantageous Effects of Invention

According to the present invention, a cubic boron nitride sintered body capable of extending the tool life by having excellent wear resistance and fracture resistance can be provided.

DETAILED DESCRIPTION

An embodiment for carrying out the present invention (hereinafter simply referred to as the "present embodiment") will hereinafter be described in detail. However, the present invention is not limited to the present embodiment described below. Various modifications may be made to the present invention without departing from the gist of the invention.

[Cubic Boron Nitride Sintered Body]

A cubic boron nitride sintered body according to the present embodiment is a cubic boron nitride sintered body including cubic boron nitride (hereinafter also referred to as "cBN") and a binder phase, wherein a content ratio of the cubic boron nitride is 85 volume % or more and 95 volume % or less based on a total amount of the sintered body, a content ratio of the binder phase is 5 volume % or more and 15 volume % or less based on the total amount of the sintered body, the binder phase contains $Co_3W_3C$, $W_2Co_{21}B_6$, and an Al compound, and $I_B/I_A$ is 0.02 or more and 0.15 or less, $I_C/I_A$ is 0.02 or more and 1.00 or less, and $I_C \geq I_D$, where $I_A$ denotes an X-ray diffraction peak intensity of a (111) plane of the cubic boron nitride, $I_B$ denotes an X-ray diffraction peak intensity of a (400) plane of the $Co_3W_3C$, $I_C$ denotes an X-ray diffraction peak intensity of a (420) plane of the $W_2Co_{21}B_6$, and $I_D$ denotes an X-ray diffraction peak intensity of a (001) plane of WC.

The cubic boron nitride sintered body according to the present embodiment can improve, owing to the above-described constitution, wear resistance and fracture resistance and, as a result, can extend tool life.

The detailed reason why the cubic boron nitride sintered body according to the present embodiment improves wear resistance and fracture resistance of a tool to provide the tool with an extended tool life is not clear, but the present inventor considers the reason as follows. However, the reason is not limited thereto.

Since the content ratio of the cubic boron nitride is 85 volume % or more in the cubic boron nitride sintered body of the present embodiment, a ratio of the binder phase is relatively low, and hence the hardness is improved, and the wear resistance is excellent. On the other hand, since the content ratio of the cubic boron nitride is 95 volume % or less in the cubic boron nitride sintered body of the present embodiment, the cubic boron nitride particles can be inhibited from dropping off, and hence the wear resistance is excellent. In addition, surface roughness on a surface to be processed of a work material is reduced in cutting processing, and appearance obtained after the processing tends to be favorable.

Since the content ratio of the binder phase is 5 volume % or more in the cubic boron nitride sintered body of the present embodiment, the cBN particles can be inhibited from dropping off, and hence the wear resistance is excellent. On the other hand, since the content ratio of the binder phase is 15 volume % or less in the cubic boron nitride sintered body, a content ratio of the cBN is relatively increased to improve the hardness, and as a result, the wear resistance is excellent.

Since the $I_B/I_A$ is 0.02 or more in the cubic boron nitride sintered body according to the present embodiment, the binding strength of the cBN sintered body is improved, and the fracture resistance is excellent. On the other hand, since the $I_B/I_A$ is 0.15 or less in the cubic boron nitride sintered body according to the present embodiment, deterioration of the hardness of the cBN sintered body is inhibited, and the wear resistance is excellent. Since the $I_C/I_A$ is 0.02 or more in the cubic boron nitride sintered body according to the present embodiment, the cubic boron nitride sintered body contains $W_2Co_{21}B_6$ to an appropriate degree, thereby cracks formed in cutting processing are inhibited from propagating to the cBN, and the chipping resistance is excellent. On the other hand, since the $I_C/I_A$ is 1.00 or less in the cubic boron nitride sintered body, the toughness of the binder phase is improved, and the fracture resistance is excellent. Since $I_C \geq I_D$ in the cubic boron nitride sintered body according to the present embodiment, the binding strength of the cBN sintered body is improved, and the fracture resistance is excellent.

The cubic boron nitride sintered body of the present embodiment, owing to a combination of those effects, can be improved in wear resistance and fracture resistance, and can extend tool life.

The cubic boron nitride sintered body of the present embodiment contains the cBN and the binder phase. The content ratio of the cBN is 85 volume % or more and 95 volume % or less based on the total amount of the sintered body. The content ratio of the binder phase is 5 volume % or more and 15 volume % or less based on the total amount of the sintered body. It is noted that the total content ratio of the cBN and the binder phase in the cubic boron nitride sintered body of the present embodiment is 100 volume %.

[Cubic Boron Nitride (cBN)]

Since the content ratio of the cubic boron nitride is 85 volume % or more in the cubic boron nitride sintered body of the present embodiment, the ratio of the binder phase is relatively low, and hence the hardness is improved, and the wear resistance is excellent. On the other hand, since the content ratio of the cubic boron nitride is 95 volume % or less in the cubic boron nitride sintered body of the present embodiment, the cubic boron nitride particles can be inhibited from dropping off, and hence the wear resistance is excellent. In addition, surface roughness on a surface to be processed of a work material is reduced in cutting processing, and appearance obtained after the processing tends to be favorable. From a similar point of view, the content ratio of the cubic boron nitride is preferably 85 volume % or more and 92 volume % or less and more preferably 85 volume % or more and 90 volume % or less.

In the cubic boron nitride sintered body according to the present embodiment, the average particle size of the cubic boron nitride (cBN) is preferably 0.5 μm or more and 4.0 μm or less. Since the average particle size of the cBN is 0.5 μm or more in the cubic boron nitride sintered body, the cBN particles can be inhibited from dropping off, and since the average particle size of the cBN is 4.0 μm or less, the mechanical strength is improved, and the fracture resistance tends to be excellent. From a similar point of view, the average particle size of the cBN is more preferably 0.5 μm or more and 3.2 μm or less, and further preferably 0.5 μm or more and 2.4 μm or less.

In the present embodiment, the average particle size of the cBN is determined, for example, in the following manner.

The cross-sectional structure of the cubic boron nitride sintered body is photographed with a SEM. The area of a cBN particle is obtained by analyzing the thus photographed cross-sectional structure, and then the diameter of a circle with an area equal to the thus obtained area is determined as the particle size of the cBN.

The average of a plurality of the cBN particles is determined as the average particle size of the cBN. The average particle size of the cBN can be determined using commercially available image analysis software from an image of a sectional structure of the cubic boron nitride sintered body. More specifically, the content can be determined by a method disclosed in the Examples described below.

[Binder Phase]

Since the content ratio of the binder phase in the cubic boron nitride sintered body of the present embodiment is 5 volume % or more, the cBN particles can be inhibited from dropping off, and the wear resistance is excellent. On the other hand, since the content ratio of the binder phase in the cubic boron nitride sintered body is 15 volume % or less, the content ratio of the cBN is relatively high, and hence the hardness is improved, resulting in excellent wear resistance. From a similar point of view, the content ratio of the binder phase is preferably 8 volume % or more and 15 volume % or less, and more preferably 10 volume % or more and 15 volume % or less.

In the cubic boron nitride sintered body according to the present embodiment, the binder phase contains $Co_3W_3C$, $W_2Co_{21}B_6$, and an Al compound, and $I_B/I_A$ is 0.02 or more and 0.15 or less, $I_C/I_A$ is 0.02 or more and 1.00 or less, and $I_C \geq I_D$, where $I_A$ denotes an X-ray diffraction peak intensity of a (111) plane of the cubic boron nitride, $I_B$ denotes an X-ray diffraction peak intensity of a (400) plane of the $Co_3W_3C$, $I_C$ denotes an X-ray diffraction peak intensity of a (420) plane of the $W_2Co_{21}B_6$, and $I_D$ denotes an X-ray diffraction peak intensity of a (001) plane of WC.

Non-limiting specific examples of compounds that can be contained in the binder phase according to the present embodiment other than the $Co_3W_3C$, $W_2Co_{21}B_6$, and Al compound include WC, CoWB, $W_2C$, and WB as compounds containing W. Examples of Al compounds (compounds containing Al element) include CoAl, AlN, $AlB_2$, and $Al_2O_3$, and composite compounds of them.

Examples of Cr compounds (compounds containing Cr element) include CrN, $Cr_2N$, $Cr_3C_2$, $Cr_7C_3$, $Cr_{23}C_6$, $Cr_2O_3$, and $CrB_2$, and composite compounds of them. In the present embodiment, the binder phase preferably contains a Cr compound, and more preferably contains CrN, similarly. If a Cr compound is contained, the grain growth of the $W_2Co_{21}B_6$ that occurs during sintering tends to be inhibited.

Examples of compounds that can be contained in the binder phase according to the present embodiment other than those described above include TiN, TiC, Ti(C,N), $TiB_2$, Co, $Co_{5.47}N$, and CoN.

In the cubic boron nitride sintered body according to the present embodiment, $I_B/I_A$ is 0.02 or more and 0.15 or less, where $I_A$ denotes an X-ray diffraction peak intensity of a (111) plane of the cubic boron nitride, and $I_B$ denotes an X-ray diffraction peak intensity of a (400) plane of the $Co_3W_3C$. Since $I_B/I_A$ is 0.02 or more, the binding strength of the cBN sintered body is improved, and the fracture resistance is excellent. Since $I_B/I_A$ is 0.15 or less, deterioration of the hardness of the cBN sintered body is inhibited, and the wear resistance is excellent. From a similar point of view, $I_B/I_A$ is preferably 0.04 or more and 0.14 or less and more preferably 0.05 or more and 0.13 or less.

In the cubic boron nitride sintered body according to the present embodiment, $I_C/I_A$ is 0.02 or more and 1.00 or less, where $I_A$ denotes an X-ray diffraction peak intensity of a (111) plane of the cubic boron nitride, and $I_C$ denotes an X-ray diffraction peak intensity of a (420) plane of the $W_2Co_{21}B_6$. Since $I_C/I_A$ is 0.02 or more, the cubic boron nitride sintered body contains $W_2Co_{21}B_6$ to an appropriate degree, thereby cracks formed in cutting processing are inhibited from propagating to the cBN, and the chipping resistance is excellent. Since $I_C/I_A$ is 1.00 or less, the toughness of the binder phase is improved, and the fracture resistance is excellent. From a similar point of view, $I_C/I_A$ is preferably 0.02 or more and 0.88 or less and more preferably 0.06 or more and 0.73 or less.

The cubic boron nitride sintered body according to the present embodiment satisfies the relationship of $I_C \geq I_D$, where $I_C$ denotes an X-ray diffraction peak intensity of a (420) plane of the $W_2Co_{21}B_6$, and $I_D$ denotes an X-ray diffraction peak intensity of a (001) plane of WC. Since $I_C \geq I_D$, the binding strength of the cBN sintered body is improved, and the fracture resistance is excellent. From a similar point of view, $I_D/I_C$ is preferably 0.00 or more and 1.00 or less, more preferably 0.00 or more and 0.60 or less, and further preferably 0.00 or more and 0.42 or less.

In the cubic boron nitride sintered body according to the present embodiment, $I_D/I_A$ is preferably 0.00 or more and 0.20 or less, where $I_D$ denotes an X-ray diffraction peak intensity of a (001) plane of WC, and $I_A$ denotes an X-ray diffraction peak intensity of a (111) plane of the cubic boron nitride. If $I_D/I_A$ is 0.20 or less, the binding strength of the cubic boron nitride sintered body is improved, and the fracture resistance tends to be excellent. From a similar point of view, $I_D/I_A$ is more preferably 0.00 or more and 0.16 or less, further preferably 0.00 or more and 0.08 or less, and even further preferably 0.00.

In the cubic boron nitride sintered body according to the present embodiment, $I_C/I_B$ is preferably 0.2 or more and 15.0 or less, where $I_B$ denotes an X-ray diffraction peak intensity of a (400) plane of the $Co_3W_3C$, and $I_C$ denotes an X-ray diffraction peak intensity of a (420) plane of the $W_2Co_{21}B_6$. If $I_C/I_B$ is 0.2 or more, the cubic boron nitride sintered body contains a specific amount or more of $W_2Co_{21}B_6$, thereby cracks formed in cutting processing are inhibited from propagating to the cubic boron nitride, and the chipping resistance and fracture resistance tend to be excellent. If $I_C/I_B$ is 15.0 or less, the binding strength of the cubic boron nitride sintered body and/or the toughness of the binder phase are improved, and the fracture resistance tends to be excellent. From a similar point of view, $I_C/I_B$ is more preferably 0.6 or more and 13.5 or less and further preferably 0.6 or more and 12.0 or less.

In the cubic boron nitride sintered body according to the present embodiment, the content ratio of Al contained in the binder phase may be 0.3 mass % or more and 5 mass % or less based on 100 mass % in total of all the elements contained in the sintered body. If the content ratio of Al is 0.3 mass % or more, Al element reacts with oxygen atoms present on the surfaces of the cBN particles, and as a result the cBN particles tend to be inhibited from dropping off. If the content ratio of Al is 5.0 mass % or less, formation of Al nitride and Al boride is inhibited, and the wear resistance tends to be excellent. From a similar point of view, the content ratio of Al contained in the binder phase is preferably 0.4 mass % or more and 2.1 mass % or less and more preferably 0.6 mass % or more and 1.6 mass % or less based on 100 mass % in total of all the elements contained in the sintered body.

In the cubic boron nitride sintered body according to the present embodiment, the binder phase may contain an element other than the elements constituting the $Co_3W_3C$, $W_2Co_{21}B_6$, and Al compound. Non-limiting specific examples thereof include Cr, Ti, Zr, Nb, Mo, Hf, Ta, Mn, Fe, Ni, and N, and Cr, Ti, Zr, Nb, Mo, Ta, Mn, Ni, and N are preferred, and Cr, Ti, Zr, Mo, Ta, Ni, and N are more preferred.

Such elements may be derived from, for example, a ball mill cylinder or ball, or a high-melting-point metal capsule used for filling, and may be unavoidably contained or intentionally added. The content ratio of such another element is not especially limited, and may be, for example, 0 mass % or more and 10 mass % or less based on 100 mass % in total of all the elements contained in the sintered body.

In the cubic boron nitride sintered body according to the present embodiment, the respective content ratios (volume %) of the cubic boron nitride and the binder phase can be determined by analyzing, using commercially available image analysis software, a structural photograph of the cubic boron nitride sintered body taken by a scanning electron microscope (SEM). More specifically, the cubic boron nitride sintered body is mirror-polished in a direction orthogonal to a surface thereof. Next, using a SEM, an observation is conducted on a backscattered electron image of the mirror-polished surface of the cubic boron nitride sintered body exposed via the mirror polishing. At this time, the mirror-polished surface of the cubic boron nitride sintered body is observed using a SEM via a backscattered electron image at a magnification such that 100 or more and 400 or less cubic boron nitride particles can be covered. Using an energy-dispersive X-ray spectroscope (EDS) included with the SEM, it can be determined that a black region is identified as cubic boron nitride, and a gray region and a white region are each identified as a binder phase.

Thereafter, a structural photograph of the above cross section of the cubic boron nitride is taken using a SEM. With commercially available image analysis software, the respective occupied areas of the cubic boron nitride and the binder phase are obtained from the obtained structural photograph, and the content ratios (volume %) are obtained from the occupied areas.

In the present embodiment, the content ratio (mass %) of each of the elements in the binder phase can be determined using an energy-dispersive X-ray spectroscope (EDS) in the same observation field as that of a structural photograph of the cubic boron nitride sintered body taken with a scanning electron microscope (SEM) for obtaining the content ratios (volume %) of the cubic boron nitride and the binder phase. More specifically, EDS analysis is performed in the entire observation field of the magnified mirror-polished surface, and a content ratio (mass %) of each element is calculated assuming that the total content of all the elements contained in the cubic boron nitride sintered body is 100 mass %.

Herein, the mirror-polished surface of the cubic boron nitride sintered body is a cross section of the cubic boron nitride sintered body obtained by mirror-polishing the surface of the cubic boron nitride sintered body or an arbitrary cross-section thereof. Examples of a method for obtaining a mirror-polished surface of a cubic boron nitride sintered body include a polishing method using diamond paste.

The composition of a binder phase can be identified using a commercially available X-ray diffractometer. For example, when an X-ray diffraction measurement is performed, using an X-ray diffractometer (product name "RINT TTR III") manufactured by Rigaku Corporation, by means of a 2θ/θ focusing optical system with Cu-Kα radiation, the composition of the binder phase can be identified. Here, measurement conditions are, for example, preferably conditions described later in Examples. Analysis with a broader 2θ measurement range tends to allow more peaks to be detected, and materials contained in the sintered body can be more reliably specified. From such a point of view, measurement, for example, in the range of 2θ=20 to 140° is preferable.

In the present embodiment, the cubic boron nitride content ratio and the binder phase content ratio, and the binder phase composition can be determined by the methods described in the Examples mentioned below. Specifically, the composition of the binder phase can be specified by analyzing a measurement result obtained with an X-ray analyzer, and an element mapping result obtained using an EDS.

In the cubic boron nitride sintered body according to the present embodiment, the full width at half maximum of an X-ray diffraction peak intensity of a (420) plane of the $W_2Co_{21}B_6$, $I_C$, is preferably 0.25 or more and 0.60 or less. If the full width at half maximum of $I_C$ is 0.25 or more, the toughness of the binder phase is improved, and the fracture resistance tends to be excellent. If the full width at half maximum of $I_C$ is 0.60 or less, cracks formed in cutting processing are inhibited from propagating to the cubic boron nitride, and the chipping resistance and fracture resistance tend to be improved. From a similar point of view, the full width at half maximum of $I_C$ is more preferably 0.28 or more and 0.60 or less and further preferably 0.32 or more and 0.48 or less.

[Method for Producing Cubic Boron Nitride Sintered Body]

The cubic boron nitride sintered body according to the present embodiment is manufactured, for example, in the following manner.

As raw material powder, cBN powder, WC powder, Co powder, Al powder, and Cr powder are prepared. Here, the average particle size of the cBN in an obtained cubic boron nitride sintered body can be controlled within the above specific range by appropriately adjusting the average particle size of the raw material cBN powder. In addition, the content ratios of the cBN and the binder phase in an obtained cubic boron nitride sintered body can be controlled within the above specific ranges by appropriately adjusting the proportion of each raw material powder. Next, the prepared raw material powder is put in a ball mill cylinder together with cemented carbide balls, a solvent, and paraffin, and then mixed. The raw material powder mixed with a ball mill is filled in a high-melting-point metal capsule made of Ta, and subjected to a vacuum heat treatment with the capsule left opened for removing moisture adsorbed onto the surface of the powder and another adhering component.

Next, the capsule is sealed, and the raw material powder filled in the capsule is sintered at a high pressure. In filling the raw material powder in the capsule, a substrate of cemented carbide may be put on the bottom thereof. For example, the conditions of the high-pressure sintering are a pressure of 7.7 to 8.5 GPa, a temperature increase rate of 20 to 30° C./sec, a temperature of 1800 to 1900° C., and a sintering time of 30 to 45 minutes.

In the binder phase used in the present embodiment, non-limiting examples of a method for setting high the $I_B/I_A$ described above include a method in which the temperature in sintering is increased in the production process of the cubic boron nitride sintered body, a method in which the temperature increase rate in sintering is increased, a method in which the content ratio of the cBN is reduced, a method in which the blending proportion of the Co powder in the materials of the binder phase is increased, and a method in which the blending proportion of the Al powder in the materials of the binder phase is reduced.

In the binder phase used in the present embodiment, non-limiting examples of a method for setting high the $I_C/I_A$ described above include a method in which the pressure in sintering is reduced in the production process of the cubic boron nitride sintered body, a method in which the content ratio of the cBN is reduced, a method in which the average particle size of the cBN is reduced, and a method in which the blending proportion of the Co power in the materials of the binder phase is increased.

In the binder phase used in the present embodiment, non-limiting examples of a method for setting low the $I_D/I_A$ described above include a method in which the temperature in sintering is increased in the production process of the cubic boron nitride sintered body, a method in which the content ratio of the cBN is reduced, and a method in which the blending proportion of the WC powder as a material of the binder phase is reduced.

In the binder phase used in the present embodiment, non-limiting examples of a method for satisfying the $I_D$ $I_D$ described above or setting low the $I_D/I_D$ include a method in which the temperature in sintering is increased in the production process of the cubic boron nitride sintered body, a method in which the temperature increase rate in sintering is increased, a method in which the content ratio of the cBN is increased, and a method in which the blending proportion of the WC powder as a material of the binder phase is reduced.

In the binder phase used in the present embodiment, non-limiting examples of a method for setting high the $I_C/I_B$ described above include a method in which the temperature in sintering is reduced in the production process of the cubic boron nitride sintered body, a method in which the temperature increase rate in sintering is reduced, a method in which the pressure in sintering is reduced, and a method in which the blending proportion of the Al powder in the materials of the binder phase is reduced.

In the binder phase used in the present embodiment, non-limiting examples of a method for setting large the full width at half maximum of $I_C$ described above include a method in which the content ratio of the cBN is increased in the production process of the cubic boron nitride sintered body, and a method in which the cubic boron nitride sintered body is allowed to contain a Cr compound. If the average particle size of $W_2Co_{21}B_6$ contained in the binder phase is reduced, the full width at half maximum of $I_C$ tends to become larger.

The cubic boron nitride sintered body according to the present embodiment may be used as a coated cubic boron nitride sintered body including a coating layer on a surface thereof. The coating layer formed on a surface of the cubic boron nitride sintered body further improves the wear resistance. The coating layer is not especially limited, and may include, for example, an element of at least one selected from the group consisting of Ti, Zr, Hf, V, Nb, Ta, Cr, Mo, W, Al, and Si, and an element of at least one selected from the group consisting of C, N, O, and B. The coating layer may have a single-layer structure or a laminated structure including two or more layers. When the coating layer has such structures, the coated cubic boron nitride sintered body according to the present embodiment tends to show further improved wear resistance.

Non-limiting specific examples of compounds forming the coating layer include TiN, TiC, TiCN, TiAlN, TiSiN, AlCrN, and the like. Among these, TiCN, TiAlN, and AlCrN are preferred. The coating layer may have a structure in which multiple layers each having a different composition are laminated.

The thickness of each layer that constitutes the coating layer and the thickness of the entire coating layer can be measured from a cross-sectional structure of the coated cubic boron nitride sintered body using an optical microscope, a SEM, a transmission electron microscope (TEM), or the like. It should be noted that, as to the average thickness of each layer and the average thickness of the entire coating layer in the coated cubic boron nitride sintered body, such average thicknesses can be obtained by measuring, near the position 50 μm from the edge of a surface facing the metal evaporation source toward the center of such surface, the thickness of each layer and the thickness of the entire coating layer from each of the cross sections at three or more locations, and calculating the average value thereof.

The composition of each layer that constitutes the coating layer can be measured from a cross-sectional structure of the coated cubic boron nitride sintered body using an EDS, a wavelength-dispersive X-ray spectroscope (WDS), or the like.

A method of manufacturing a coating layer is not particularly limited, and examples of such methods include chemical deposition methods and physical vapor deposition methods, such as an ion plating method, an arc ion plating method, a sputtering method, and an ion mixing method. Among them, arc ion plating methods are preferred because further better adhesiveness between the coating layer and the cubic boron nitride sintered body can be provided.

The cubic boron nitride sintered body or the coated cubic boron nitride sintered body according to the present embodiment show excellent wear resistance and fracture resistance, and is therefore preferably used as cutting tools and wear-resistant tools, and among them, is preferably used as cutting tools. The cubic boron nitride sintered body or the coated cubic boron nitride sintered body according to the present embodiment is further preferably used as cutting tools for sintered metals or cast iron. The tool life can be extended compared to conventional tools when the cubic boron nitride sintered body or the coated cubic boron nitride sintered body according to the present embodiment is used as cutting tools or wear-resistant tools.

EXAMPLES

Although the present invention will be described in further detail below with examples, the present invention is not limited to such examples.

Example 1

[Preparation of Raw Material Powder]

A WC powder, a Co powder, an Al powder, and a Cr powder were mixed in the proportion (mass %) listed in the following Table 1 to prepare eight different binder phase materials A to I. The average particle sizes of the WC powder, the Co powder, the Al powder, and the Cr powder were respectively 2.0 μm, 1.5 μm, 1.8 μm, and 2.8 μm. The average particle size of each raw material powder was measured in accordance with the Fisher process (Fisher Sub-Sieve Sizer (FSSS)) disclosed in the American Society for Testing Materials (ASTM) standard B330. It is noted that "–" used in Table 1 denotes that the corresponding raw material is not contained.

Together with the above binder phase materials, a cubic boron nitride (cBN) powder was mixed in the proportion (volume %) listed in Table 2.

TABLE 1

| | Blending Proportion (mass %) | | | |
|---|---|---|---|---|
| Type | WC | Co | Al | Cr |
| Binder Phase Material A | 27 | 70 | 3 | — |
| Binder Phase Material B | 30 | 67 | 3 | — |
| Binder Phase Material C | 32 | 65 | 3 | — |
| Binder Phase Material D | 48 | 45 | 7 | — |
| Binder Phase Material E | 39 | 47 | 14 | — |
| Binder Phase Material F | 24 | 70 | 3 | 3 |
| Binder Phase Material G | 27 | 67 | 3 | 3 |
| Binder Phase Material H | 21 | 51 | 3 | 25 |
| Binder Phase Material I | 15 | 33 | 4 | 48 |

TABLE 2

| Sample Number | Raw Material Powder: cBN: Blending Proportion (volume %) | Raw Material Powder: cBN: Average Particle Size (μm) | Raw Material Powder: Binder Phase: Blending Proportion (volume %) | Raw Material Powder: Binder Phase: Type of Binder Phase Material |
|---|---|---|---|---|
| Invention Sample 1 | 91 | 1.8 | 9 | C |
| Invention Sample 2 | 91 | 1.0 | 9 | C |
| Invention Sample 3 | 91 | 0.5 | 9 | D |
| Invention Sample 4 | 91 | 1.0 | 9 | D |
| Invention Sample 5 | 88 | 1.8 | 12 | C |
| Invention Sample 6 | 87 | 1.8 | 13 | C |
| Invention Sample 7 | 91 | 0.3 | 9 | C |
| Invention Sample 8 | 91 | 1.8 | 9 | G |
| Invention Sample 9 | 91 | 1.0 | 9 | G |
| Invention Sample 10 | 96 | 2.4 | 4 | D |
| Invention Sample 11 | 93 | 0.7 | 7 | D |
| Invention Sample 12 | 86 | 0.5 | 14 | B |
| Invention Sample 13 | 96 | 1.0 | 4 | G |
| Invention Sample 14 | 96 | 4.0 | 4 | D |
| Invention Sample 15 | 91 | 3.2 | 9 | H |
| Invention Sample 16 | 91 | 6.0 | 9 | I |
| Invention Sample 17 | 87 | 4.0 | 13 | D |
| Comparative Sample 1 | 91 | 4.0 | 9 | C |
| Comparative Sample 2 | 91 | 3.2 | 9 | C |
| Comparative Sample 3 | 91 | 1.8 | 9 | E |
| Comparative Sample 4 | 91 | 6.0 | 9 | C |
| Comparative Sample 5 | 88 | 1.0 | 12 | C |
| Comparative Sample 6 | 91 | 0.5 | 9 | C |
| Comparative Sample 7 | 91 | 0.3 | 9 | C |
| Comparative Sample 8 | 98 | 3.2 | 2 | E |
| Comparative Sample 9 | 86 | 1.8 | 14 | B |
| Comparative Sample 10 | 82 | 1.0 | 18 | A |
| Comparative Sample 11 | 84 | 2.4 | 18 | D |
| Comparative Sample 12 | 86 | 1.8 | 14 | F |

[Mixing Process]

The raw material powder, hexane solvent, and paraffin were put in a ball mill cylinder together with a cemented carbide ball to be further mixed.

[Filling Process and Drying Process]

The mixed raw material powder was filled in a disc-shaped high-melting-point metal capsule made of Ta. For removing moisture adsorbed onto the surface of the filled raw material powder and organic components, a vacuum heat treatment was performed with the capsule left opened to remove moisture adsorbed onto the surface of the powder and another adhering component, and the capsule was then sealed.

[High-Pressure Sintering]

Thereafter, the raw material powder filled in the capsule was sintered at a high pressure. The following Table 3 shows the conditions for the high-pressure sintering.

TABLE 3

| Sample Number | Sintering Conditions: Temperature (° C.) | Sintering Conditions: Temperature increase rate (° C./sec) | Sintering Conditions: Pressure (GPa) | Sintering Conditions: Time (min) |
|---|---|---|---|---|
| Invention Sample 1 | 1800 | 20 | 7.7 | 30 |
| Invention Sample 2 | 1900 | 30 | 8.5 | 30 |
| Invention Sample 3 | 1900 | 25 | 8.5 | 30 |
| Invention Sample 4 | 1800 | 25 | 7.7 | 30 |
| Invention Sample 5 | 1900 | 20 | 7.7 | 30 |
| Invention Sample 6 | 1850 | 20 | 7.7 | 30 |
| Invention Sample 7 | 1800 | 20 | 7.7 | 30 |
| Invention Sample 8 | 1800 | 20 | 7.7 | 30 |
| Invention Sample 9 | 1900 | 20 | 8.5 | 30 |
| Invention Sample 10 | 1800 | 25 | 8.5 | 45 |
| Invention Sample 11 | 1850 | 25 | 8.5 | 30 |
| Invention Sample 12 | 1900 | 20 | 7.7 | 30 |
| Invention Sample 13 | 1850 | 20 | 8.5 | 45 |
| Invention Sample 14 | 1900 | 30 | 8.5 | 45 |
| Invention Sample 15 | 1900 | 30 | 8.5 | 45 |
| Invention Sample 16 | 1900 | 30 | 8.5 | 45 |
| Invention Sample 17 | 1800 | 20 | 8.5 | 30 |
| Comparative Sample 1 | 1600 | 1 | 7.7 | 30 |
| Comparative Sample 2 | 1700 | 1 | 7.7 | 30 |
| Comparative Sample 3 | 1800 | 5 | 7.7 | 30 |
| Comparative Sample 4 | 2000 | 30 | 8.5 | 30 |
| Comparative Sample 5 | 2000 | 30 | 7.7 | 30 |
| Comparative Sample 6 | 1950 | 20 | 7.7 | 30 |
| Comparative Sample 7 | 1800 | 1 | 7.7 | 30 |
| Comparative Sample 8 | 1800 | 1 | 8.5 | 45 |
| Comparative Sample 9 | 1800 | 15 | 7.7 | 30 |
| Comparative Sample 10 | 1800 | 5 | 7.7 | 30 |
| Comparative Sample 11 | 1800 | 10 | 7.7 | 30 |
| Comparative Sample 12 | 1800 | 20 | 7.7 | 30 |

[Measurement/Analysis]

The content ratios (volume %) of the cubic boron nitride and the binder phase in the cubic boron nitride sintered body obtained by high-pressure sintering was determined by analyzing a structural photograph of the cubic boron nitride sintered body, which had been taken by a scanning electron microscope (SEM), using commercially available image analysis software. More specifically, the cubic boron nitride sintered body was mirror-polished in a direction orthogonal to a surface thereof. Next, a backscattered electron image of the mirror-polished surface of the cubic boron nitride sintered body exposed via the mirror polishing was observed using a SEM. At this time, the mirror-polished surface of the cubic boron nitride sintered body was observed using the SEM via a backscattered electron image at a magnification such that 100 or more and 400 or less cubic boron nitride particles could be covered. Using an energy-dispersive X-ray spectroscope (EDS) included with the SEM, a black region was identified as cubic boron nitride, and gray and white regions were identified as binder phases. Thereafter, a structural photograph of the mirror-polished surface of the cubic boron nitride was taken using the SEM. With commercially available image analysis software, the respective occupied areas of the cubic boron nitride and the binder phase were determined from the obtained structural photograph, and the content ratios (volume %) were determined from the occupied areas.

Here, the mirror-polished surface of the cubic boron nitride sintered body was a cross section of the cubic boron nitride sintered body obtained by mirror-polishing the surface of the cubic boron nitride sintered body or an arbitrary cross-section thereof. Polishing using diamond paste was adopted as the method for obtaining a mirror-polished surface of a cubic boron nitride sintered body (hereinafter also referred to as the "cross section").

Through the image analysis of the structural photograph of the cubic boron nitride sintered body taken with the SEM, the area of a cBN particle was obtained, and the diameter of a circle with an area equal to the thus obtained area was determined as the particle size of the cBN. Subsequently, a value satisfying the relationship of the following expression was determined as the average particle size of the cBN.

$$(\text{Area occupied by } cBN \text{ particles having particle size of } D50 \text{ or less})/(\text{Area occupied by all the } cBN \text{ particles})=0.5$$

The composition of the binder phase was identified using an X-ray diffractometer (product name "RINT TTR III") manufactured by Rigaku Corporation. Specifically, a result of X-ray diffraction measurement of a 2θ/θ focusing optical system performed using Cu-Kα ray under the following conditions and an element mapping result using an EDS were analyzed to identify the composition of the binder phase.

<Measurement Conditions>

Output: 50 kV, 250 mA

Incident-side Soller slit: 5°

Divergence vertical slit: ½°

Divergence vertical restriction slit: 10 mm

Scattering slit: ⅔°

Light-receiving side Soller slit: 5°

Light reception slit: 0.15 mm

BENT monochromator

Light-receiving monochrome slit: 0.8 mm

Sampling width: 0.02°

Scan speed: 1°/min

2θ measurement range: 30° to 90°

Specifically, it was specified, through the X-ray diffraction measurement performed by the above-described method, that the obtained cubic boron nitride sintered body contained the following materials:

$Co_3W_3C$ (excluding comparative samples 1 to 3, 7, and 8)

$W_2Co_{21}B_6$

WC (excluding invention samples 2, 9, and 14 to 16, and comparative samples 4 to 6 and 8)

As to the compound containing Al element, no clear peak was obtained in the X-ray diffraction measurement, and hence the identification was performed through the element mapping using an EDS. As to the compound containing Cr element, no clear peak was obtained in the X-ray diffraction measurement except for CrN, and hence the identification was performed through the element mapping using an EDS. As a result, it was found that all the cubic boron nitride sintered bodies obtained contained a compound containing Al element (in a table, expressed as Al compound, simply). It was found that the invention samples 8, 9, and 13 and the comparative sample 12 contained a Cr compound estimated to consist of a plurality of Cr compounds, and the invention samples 15 and 16 contained CrN. In addition, the samples produced with the binder phase materials F to I tended to show large full width at half maximums of $I_C$. The reason is presumably that the Cr compounds contained in the binder phases inhibited the grain growth of $W_2Co_{21}B_6$ that would occur in sintering; however, the reason is not limited thereto.

The content ratio (volume %) of each element in the binder phase was determined, using the EDS, in the same observation field as that of the structural photograph of the cubic boron nitride sintered body taken with the SEM for obtaining the content ratios (volume %) of the cBN and the binder phase. Specifically, EDS analysis was performed in the entire observation field of the magnified mirror-polished surface, and the content ratio (mass %) of Al assuming that the total content of all the elements contained in the cubic boron nitride sintered body was 100 mass % was calculated.

The measurement results thus obtained are all listed in Table 4.

From the X-ray diffraction peak intensity of a (111) plane of cubic boron nitride ($I_A$), the X-ray diffraction peak intensity of a (400) plane of $Co_3W_3C$ ($I_B$), the X-ray diffraction peak intensity of a (420) plane of $W_2Co_{21}B_6$ ($I_C$), and the X-ray diffraction peak intensity of a (001) plane of WC ($I_D$), each obtained simultaneously with the X-ray diffraction measurement, $I_B/I_A$, $I_C/I_A$, $I_D/I_A$, $I_C/I_B$, and full width at half maximums of $I_C$ were calculated, and whether $I_C \geq I_D$ was satisfied was determined. The X-ray diffraction peak for each crystal plane was specified on the bases of information of the corresponding PDF (Powder Diffraction File) card No. shown below, and had a peak top in the corresponding range shown below. The values thus obtained are summarized in Table 5.

(111) plane of cBN: PDF card No. 73-0887, range: 42.7° or more and 43.9° or less (400) plane of $Co_3W_3C$: PDF card No. 06-0639, range: 31.9° or more and 32.7° or less (420) plane of $W_2Co_{21}B_6$: PDF card No. 19-0372, range: 37.7° or more and 38.7° or less (001) plane of WC: PDF card No. 65-4539, range: 31.2° or more and 31.8° or less

TABLE 4

| Sample Number | cBN Sintered Body: cBN Content Ratio (volume %) | cBN Average Particle Size (μm) | Binder Phase Content Ratio (volume %) | Composition | Al Content Ratio (mass %) |
|---|---|---|---|---|---|
| Invention Sample 1 | 90 | 1.8 | 10 | $Co_3W_3C$, $W_2Co_{21}B_6$, WC, Al Compound | 0.7 |
| Invention Sample 2 | 90 | 1.0 | 10 | $Co_3W_3C$, $W_2Co_{21}B_6$, Al Compound | 0.7 |
| Invention Sample 3 | 90 | 0.5 | 10 | $Co_3W_3C$, $W_2Co_{21}B_6$, WC, Al Compound | 1.6 |
| Invention Sample 4 | 90 | 1.0 | 10 | $Co_3W_3C$, $W_2Co_{21}B_6$, WC, Al Compound | 1.6 |
| Invention Sample 5 | 87 | 1.8 | 13 | $Co_3W_3C$, $W_2Co_{21}B_6$, WC, Al Compound | 0.9 |
| Invention Sample 6 | 86 | 1.8 | 14 | $Co_3W_3C$, $W_2Co_{21}B_6$, WC, Al Compound | 0.9 |
| Invention Sample 7 | 90 | 0.3 | 10 | $Co_3W_3C$, $W_2Co_{21}B_6$, WC, Al Compound | 0.7 |
| Invention Sample 8 | 90 | 1.8 | 10 | $Co_3W_3C$, $W_2Co_{21}B_6$, WC, Al Compound, Cr Compound | 0.7 |
| Invention Sample 9 | 90 | 1.0 | 10 | $Co_3W_3C$, $W_2Co_{21}B_6$, Al Compound, Cr Compound | 0.7 |
| Invention Sample 10 | 95 | 2.4 | 5 | $Co_3W_3C$, $W_2Co_{21}B_6$, WC, Al Compound | 0.9 |
| Invention Sample 11 | 92 | 0.7 | 8 | $Co_3W_3C$, $W_2Co_{21}B_6$, WC, Al Compound | 1.3 |
| Invention Sample 12 | 85 | 0.5 | 15 | $Co_3W_3C$, $W_2Co_{21}B_6$, WC, Al Compound | 1.0 |
| Invention Sample 13 | 95 | 1.0 | 5 | $Co_3W_3C$, $W_2Co_{21}B_6$, WC, Al Compound, Cr Compound | 0.4 |
| Invention Sample 14 | 95 | 4.0 | 5 | $Co_3W_3C$, $W_2Co_{21}B_6$, Al Compound | 0.9 |
| Invention Sample 15 | 90 | 3.2 | 10 | $Co_3W_3C$, $W_2Co_{21}B_6$, Al Compound, CrN | 0.6 |
| Invention Sample 16 | 90 | 6.0 | 10 | $Co_3W_3C$, $W_2Co_{21}B_6$, Al Compound, CrN | 0.8 |
| Invention Sample 17 | 36 | 4.0 | 14 | $Co_3W_3C$, $W_2Co_{21}B_6$, WC, Al Compound | 2.1 |
| Comparative Sample 1 | 90 | 4.0 | 10 | $W_2Co_{21}B_6$, WC, Al Compound | 0.7 |
| Comparative Sample 2 | 90 | 3.2 | 10 | $W_2Co_{21}B_6$, WC, Al Compound | 0.7 |
| Comparative Sample 3 | 90 | 1.8 | 10 | $W_2Co_{21}B_6$, WC, Al Compound | 2.8 |
| Comparative Sample 4 | 90 | 6.0 | 10 | $Co_3W_3C$, $W_2Co_{21}$ $B_6$, Al Compound | 0.7 |
| Comparative Sample 5 | 87 | 1.0 | 13 | $Co_3W_3C$, $W_2Co_{21}$ $B_6$, Al Compound | 0.9 |
| Comparative Sample 6 | 90 | 0.5 | 10 | $Co_3W_3C$, $W_2Co_{21}$ $B_6$, Al Compound | 0.7 |
| Comparative Sample 7 | 90 | 0.3 | 10 | $W_2Co_{21}$ $B_6$, WC, Al Compound | 0.7 |
| Comparative Sample 8 | 97 | 3.2 | 3 | $W_2Co_{21}$ $B_6$, Al Compound | 0.9 |
| Comparative Sample 9 | 85 | 1.8 | 15 | $Co_3W_3C$, $W_2Co_{21}B_6$, WC, Al Compound | 1.0 |
| Comparative Sample 10 | 81 | 1.0 | 19 | $Co_3W_3C$, $W_2Co_{21}B_6$, WC, Al Compound | 1.2 |
| Comparative Sample 11 | 83 | 2.4 | 17 | $Co_3W_3C$, $W_2Co_{21}B_6$, WC, Al Compound | 2.5 |
| Comparative Sample 12 | 85 | 1.8 | 15 | $Co_3W_3C$, $W_2Co_{21}B_6$, WC, Al Compound, Cr Compound | 1.0 |

TABLE 5

| Sample Number | cBN Sintered Body: $I_B/I_A$ | $I_C/I_A$ | $I_D/I_A$ | $I_C \geq I_D$ | $I_C/I_B$ | Full width at half maximum of $I_c$ |
|---|---|---|---|---|---|---|
| Invention Sample 1 | 0.07 | 0.76 | 0.10 | Yes | 10.86 | 0.24 |
| Invention Sample 2 | 0.15 | 0.48 | 0.00 | Yes | 3.20 | 0.21 |
| Invention Sample 3 | 0.06 | 0.40 | 0.14 | Yes | 6.67 | 0.23 |
| Invention Sample 4 | 0.04 | 0.73 | 0.28 | Yes | 18.25 | 0.22 |
| Invention Sample 5 | 0.12 | 0.82 | 0.06 | Yes | 6.83 | 0.23 |
| Invention Sample 6 | 0.06 | 0.88 | 0.16 | Yes | 14.67 | 0.29 |
| Invention Sample 7 | 0.05 | 0.98 | 0.18 | Yes | 19.60 | 0.31 |
| Invention Sample 8 | 0.05 | 0.73 | 0.10 | Yes | 14.60 | 0.36 |
| Invention Sample 9 | 0.11 | 0.44 | 0.00 | Yes | 4.00 | 0.41 |
| Invention Sample 10 | 0.02 | 0.27 | 0.05 | Yes | 13.50 | 0.34 |
| Invention Sample 11 | 0.05 | 0.60 | 0.08 | Yes | 12.00 | 0.28 |
| Invention Sample 12 | 0.10 | 0.95 | 0.20 | Yes | 9.50 | 0.24 |
| Invention Sample 13 | 0.04 | 0.43 | 0.02 | Yes | 10.75 | 0.39 |
| Invention Sample 14 | 0.13 | 0.02 | 0.00 | Yes | 0.15 | 0.32 |
| Invention Sample 15 | 0.10 | 0.06 | 0.00 | Yes | 0.60 | 0.48 |
| Invention Sample 16 | 0.14 | 0.02 | 0.00 | Yes | 0.14 | 0.60 |
| Invention Sample 17 | 0.06 | 0.62 | 0.26 | Yes | 10.33 | 0.29 |
| Comparative Sample 1 | 0.00 | 0.09 | 0.54 | No | — | 0.20 |
| Comparative Sample 2 | 0.00 | 0.30 | 0.36 | No | — | 0.20 |
| Comparative Sample 3 | 0.00 | 0.40 | 0.20 | Yes | — | 0.23 |
| Comparative Sample 4 | 0.28 | 0.02 | 0.00 | Yes | 0.07 | 0.19 |
| Comparative Sample 5 | 0.24 | 0.75 | 0.00 | Yes | 3.13 | 0.17 |
| Comparative Sample 6 | 0.18 | 0.83 | 0.00 | Yes | 4.61 | 0.20 |
| Comparative Sample 7 | 0.00 | 0.97 | 0.38 | Yes | — | 0.34 |
| Comparative Sample 8 | 0.00 | 0.20 | 0.00 | Yes | — | 0.32 |
| Comparative Sample 9 | 0.14 | 1.06 | 0.36 | Yes | 7.57 | 0.20 |
| Comparative Sample 10 | 0.18 | 1.10 | 0.40 | Yes | 5.00 | 0.18 |
| Comparative Sample 11 | 0.10 | 0.43 | 0.18 | Yes | 4.30 | 0.20 |
| Comparative Sample 12 | 0.18 | 1.23 | 0.06 | Yes | 6.83 | 0.36 |

[Preparation of Cutting Tool]

The obtained cubic boron nitride sintered body was cut out so as to correspond to the insert-shaped tool shape defined in the ISO standard CNGA 120408 using a wire electric discharge machine. The cut-out cubic boron nitride sintered body was joined to a cemented carbide base metal via brazing. The brazed tool was honing-processed to obtain a cutting tool.

[Cutting Test]

By using the obtained cutting tools, a cutting test was performed under the following conditions.

Work material: sintered metal (material: Old JIS Standard SMF4040, hardness: HRB80)

Work material shape: Gear shape, ϕ45 mm (tooth depth: 8 mm)×30 mm

Cutting speed: 200 m/min,

Feed: 0.15 mm/rev,

Depth of cut: 0.20 mm,

Coolant: not used (dry cutting)

Evaluation items: Damage forms at a processing time of 10 minutes were observed with a SEM or an optical microscope. At this time, when a minute fracture that allowed processing to be continued occurred, the damage form was defined as "Chipped" to distinguish from "Normal Wear" and "Fractured". Even when the lifetime was reached within a processing time of 10 minutes, the damage form was recorded as a reference. The tool life was defined as the processing time when the width of the flank wear of the tool had exceeded 0.15 mm, or when the tool had been fractured. Measurement results are shown in Table 6.

TABLE 6

| | Cutting Performance | |
|---|---|---|
| Sample Number | Damage Form After Processing for 10 minutes | Tool Lifetime (min) |
| Invention Sample 1 | Normal Wear | 23 |
| Invention Sample 2 | Normal Wear | 24 |
| Invention Sample 3 | Normal Wear | 21 |
| Invention Sample 4 | Normal Wear | 17 |
| Invention Sample 5 | Normal Wear | 22 |
| Invention Sample 6 | Normal Wear | 24 |
| Invention Sample 7 | Normal Wear | 19 |
| Invention Sample 8 | Normal Wear | 29 |
| Invention Sample 9 | Normal Wear | 33 |
| Invention Sample 10 | Normal Wear | 20 |
| Invention Sample 11 | Normal Wear | 25 |
| Invention Sample 12 | Normal Wear | 20 |
| Invention Sample 13 | Normal Wear | 28 |
| Invention Sample 14 | Normal Wear | 26 |
| Invention Sample 15 | Normal Wear | 24 |
| Invention Sample 16 | Normal Wear | 20 |
| Invention Sample 17 | Normal Wear | 19 |
| Comparative Sample 1 | Fractured | 3 |
| Comparative Sample 2 | Fractured | 4 |
| Comparative Sample 3 | Fractured | 7 |
| Comparative Sample 4 | Normal Wear | 12 |
| Comparative Sample 5 | Chipped | 11 |
| Comparative Sample 6 | Normal Wear | 14 |
| Comparative Sample 7 | Fractured | 7 |
| Comparative Sample 8 | Fractured | 6 |
| Comparative Sample 9 | Normal Wear | 12 |
| Comparative Sample 10 | Chipped | 11 |
| Comparative Sample 11 | Normal Wear | 15 |
| Comparative Sample 12 | Normal Wear | 14 |

Based on the results shown in Table 6, the following was found: The invention samples, in each of which the cubic boron nitride sintered body contains the cubic boron nitride and the binder phase, the content ratio of the cubic boron nitride is 85 volume % or more and 95 volume % or less based on the total amount of the sintered body, the content ratio of the binder phase is 5 volume % or more and 15 volume % or less based on the total amount of the sintered body, the binder phase contains $Co_3W_3C$, $W_2Co_{21}B_6$, and an Al compound, $I_B/I_A$ is 0.02 or more and 0.15 or less, $I_C/I_A$ is 0.02 or more and 1.00 or less, and $I_C$ $I_D$, where $I_A$ denotes an X-ray diffraction peak intensity of a (111) plane of the cubic boron nitride, $I_B$ denotes an X-ray diffraction peak intensity of a (400) plane of the $Co_3W_3C$, $I_C$ denotes an X-ray diffraction peak intensity of a (420) plane of the $W_2Co_{21}B_6$, and $I_D$ denotes an X-ray diffraction peak intensity of a (001) plane of WC, are excellent in cutting performance and have extended tool life as compared with the comparative samples not having these features.

INDUSTRIAL APPLICABILITY

The cubic boron nitride sintered body of the present invention can extend the tool life compared to conventional ones due to excellent wear resistance and excellent fracture resistance, and is highly industrially applicable in that point.

What is claimed is:

1. A cubic boron nitride sintered body comprising cubic boron nitride and a binder phase, wherein a content ratio of the cubic boron nitride is 85 volume % or more and 95 volume % or less based on a total amount of the sintered body, a content ratio of the binder phase is 5 volume % or more and 15 volume % or less based on the total amount of the sintered body, the binder phase comprises $Co_3W_3C$, $W_2Co_{21}B_6$, an Al compound, and optionally WC, and $I_B/I_A$ is 0.02 or more and 0.15 or less, $I_C/I_A$ is 0.02 or more and 1.00 or less, and $I_C \geq I_D$, where $I_A$ denotes an X-ray diffraction peak intensity of a (111) plane of the cubic boron nitride, $I_B$ denotes an X-ray diffraction peak intensity of a (400) plane of the $Co_3W_3C$, $I_C$ denotes an X-ray diffraction peak intensity of a (420) plane of the $W_2Co_{21}B_6$, and Ip denotes an X-ray diffraction peak intensity of a (001) plane of WC.

2. The cubic boron nitride sintered body according to claim 1, wherein $I_D/I_A$ is 0.00 or more and 0.20 or less.

3. The cubic boron nitride sintered body according to claim 1, wherein $I_C/I_B$ is 0.2 or more and 15.0 or less.

4. The cubic boron nitride sintered body according to claim 1, wherein a full width at half maximum of the X-ray diffraction peak intensity of the (420) plane of the $W_2Co_{21}B_6$, $I_C$, is 0.25 or more and 0.60 or less.

5. The cubic boron nitride sintered body according to claim 1, wherein an average particle size of the cubic boron nitride is 0.5 μm or more and 4.0 μm or less.

6. The cubic boron nitride sintered body according to claim 2, wherein $I_C/I_B$ is 0.2 or more and 15.0 or less.

7. The cubic boron nitride sintered body according to claim 2, wherein a full width at half maximum of the X-ray diffraction peak intensity of the (420) plane of the $W_2Co_{21}B_6$, $I_C$, is 0.25 or more and 0.60 or less.

8. The cubic boron nitride sintered body according to claim 3, wherein a full width at half maximum of the X-ray diffraction peak intensity of the (420) plane of the $W_2Co_{21}B_6$, $I_C$, is 0.25 or more and 0.60 or less.

9. The cubic boron nitride sintered body according to claim 6, wherein a full width at half maximum of the X-ray diffraction peak intensity of the (420) plane of the $W_2Co_{21}B_6$, $I_C$, is 0.25 or more and 0.60 or less.

10. The cubic boron nitride sintered body according to claim 2, wherein an average particle size of the cubic boron nitride is 0.5 μm or more and 4.0 μm or less.

11. The cubic boron nitride sintered body according to claim 3, wherein an average particle size of the cubic boron nitride is 0.5 μm or more and 4.0 μm or less.

12. The cubic boron nitride sintered body according to claim 4, wherein an average particle size of the cubic boron nitride is 0.5 μm or more and 4.0 μm or less.

13. The cubic boron nitride sintered body according to claim 6, wherein an average particle size of the cubic boron nitride is 0.5 μm or more and 4.0 μm or less.

14. The cubic boron nitride sintered body according to claim 7, wherein an average particle size of the cubic boron nitride is 0.5 μm or more and 4.0 μm or less.

15. The cubic boron nitride sintered body according to claim 8, wherein an average particle size of the cubic boron nitride is 0.5 μm or more and 4.0 μm or less.

16. The cubic boron nitride sintered body according to claim 9, wherein an average particle size of the cubic boron nitride is 0.5 μm or more and 4.0 μm or less.

* * * * *